Oct. 23, 1928.
F. C. BAXTER
1,689,066
AUTOMATIC SHUT OFF DEVICE FOR LIQUID DISPENSERS
Filed June 11, 1926
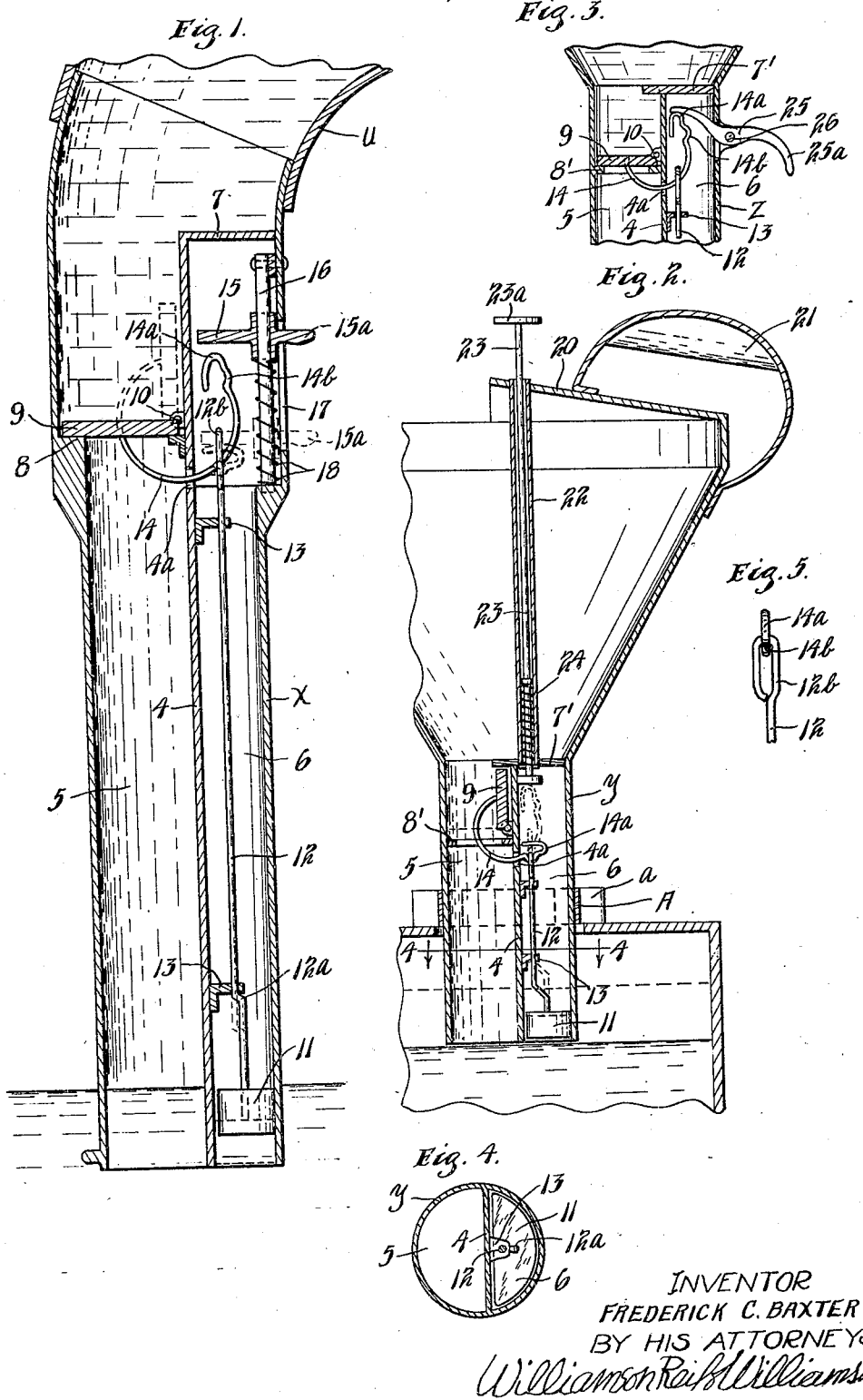
INVENTOR
FREDERICK C. BAXTER
BY HIS ATTORNEYS Patented Oct. 23, 1928.

1,689,066

UNITED STATES PATENT OFFICE.

FREDERICK C. BAXTER, OF BELVIDERE, ILLINOIS.

AUTOMATIC SHUT-OFF DEVICE FOR LIQUID DISPENSERS.

Application filed June 11, 1926. Serial No. 115,221.

The present invention relates to automatic shut off devices for liquid dispensers capable of wide general usage, and especially applicable to funnels, nozzles, spouts, and the like.

This invention is an improvement on the device disclosed in U. S. Patent No. 1,219,222, granted jointly to myself and Willis H. Kern, March 13, 1917, entitled "Funnel". In said patent a funnel is disclosed having therein a float operated valve adapted to shut off the flow of liquid when the level of the liquid within a receptacle receiving from the funnel has reached a determined height. The principal parts of this device comprised a hinged valve controlling the delivery outlet, a chamber having mounted therein a float, a member or lever connecting the float with the valve, and manually operated means for reopening the valve. These parts were all housed within the spout of the funnel or other dispensing device.

The former device was never found satisfactory for the reason that the connection member or lever was of such construction as to require a considerable amount of space rendering the device useless in smaller sized spouts and often causing the float rod having sliding engagement therewith to become bent when employed in funnels of sufficient size to accommodate said parts. This connection member must pass through one of the walls forming the float chamber and required a relatively large aperture in said wall because of its construction and since, furthermore, it was not disposed concentrically with the pivot or hinge of the valve to which it was rigidly attached. Small amounts of liquid passing through the spout would often work through said aperture into the float chamber above the float thereby seriously impairing the efficiency of the device.

Accordingly, it is the main object of the present invention to provide an improved and highly efficient automatic shut off device for liquid dispensers overcoming the above recited objections to the former invention and capable of being applied to any type of liquid dispenser in which a delivery spout or the equivalent thereof is employed.

A further object of this invention is to provide such a device adapted to automatically shut off the flow of liquid when the level of liquid within a tank or receptacle being filled has reached a determined height.

Another object is to provide in such a device an improved and simpler means over said former invention for manually reopening the valve and resetting the connecting member to be tripped by the float.

A more specific object is to provide a float controlled hinged valve for liquid dispensers having an arcuate connecting member or lever between the valve and float concentrically disposed with reference to the pivot for the valve.

These and other objects of the invention will be apparent from the following description made in connection with the accompanying drawings, wherein like characters refer to similar parts throughout the several views, and in which—

Fig. 1 is a vertical section showing the invention applied to a filling nozzle, such as the type used in gasoline stations;

Fig. 2 is a vertical section of a funnel having the invention embodied therein;

Fig. 3 is a vertical section showing the invention applied to a delivery spout or nozzle and having a preferred form of valve opening means included therein;

Fig. 4 is a cross section taken on the line 4—4 of Fig. 2; and

Fig. 5 is an enlarged detail view showing the engagement of the extension lever or connecting member with the upper end of the float rod.

In Fig. 1, a nozzle of the type used in filling stations is shown having a substantially cylindrical delivery spout X and attached at its upper end to the end of hose U. Spout X is longitudinally divided by means of the partition 4, forming a liquid passage 5, of relatively large size and a relatively small float chamber 6. Float chamber 6 is closed at its upper end by a segmentally shaped partition 7. A valve seat 8 is formed adjacent the top of passage 5 adapted to engage the segmentally shaped plate valve 9 pivoted at 10 along its inner edge to partition 4 and adapted to tightly close passage 5.

A segmentally shaped float 11 is housed within float chamber 6 for vertical movement therein and carries an upstanding stem or rod 12 extending to a point substantially at the level of valve 8. Stem 12 is guided by bearings 13 secured at the adjacent side of partition 4 and is limited in upward movement by means of the shoulder 12ª.

The stem 12 of float 11 is connected to valve 9 by means of an extension member or rod 14 rigidly carried by the lower side of valve 8. Rod 14 preferably comprises a substantially arcuate rod rigidly secured at one end to the bottom of valve 9 and disposed concentrically with the pivot 10 of said valve. A relatively small aperture 4ª is formed through partition 4 to permit rod 14 to pass therethrough into the upper portion of the float chamber. Rod 14 passes through an eye 12ᵇ carried at the top of the float stem 12. The free end of connecting member 14 terminates in an upwardly bent loop 14ª having a relatively small depressed portion 14ᵇ in which the eye 12ᵇ is adapted to rest when the valve is opened (see Fig. 2). When float 11 is raised, it will be obvious that the upper outer portion of the eye 12ᵇ will contact the end portion of the loop 14ª causing valve 9 to be tripped or swung downwardly to such extent that the flow of liquid will co-operate to close valve 9 against its seat 8, connecting member 14 slipping through eye 12ᵇ.

When valve 9 is closed, as shown in Fig. 1 the loop 14ª will be disposed considerably above its position when the valve is open and directly beneath a manually operated plunger 15 vertically slidable on a relatively small rod 16, which is mounted in the upper portion of float chamber 6. Plunger 15 carries a finger piece 15ª projecting through a slot 17 formed in the adjacent side of the nozzle and is operative to permit said plunger to be depressed against a small coiled spring 18 encircling rod 16.

Valve 9 being closed, it is only necessary to quickly push plunger 15 downwardly to reopen the valve, the weight of float 11 supported from the recessed portion 14ᵇ of connecting member 14 being sufficient to adequately hold the valve in open position.

In Fig. 2, a funnel is illustrated having a delivery spout Y divided by partition 4 into liquid passage 5 and float chamber 6. A segmentally shaped valve seat 8′ is mounted adjacent the upper end of liquid passage 5 adapted to retain the plate valve 9 in closed position. Connecting member 14, float 11 and float rod 12 are identical with said parts shown in Fig. 1. The segmental partition 7′ closing the upper end of the float chamber, however, in the funnel extends above the outer edge of valve 9 when the valve is opened to protect the same. A hood 20 partially covers the top of the funnel having secured thereto the handle 21 and supporting the vertically disposed tubular member 22, which extends downwardly and which passes through partition 7′ at its lower end. A plunger 23 is slidably disposed within tubular member 22 having an enlarged head at its lower end adapted to contact the loop 14ª of connecting member 14 to open valve 9. Coiled spring 24 is interposed between an enlarged portion on plunger 23, and a seat formed adjacent the lower end of tubular member 22 whereby plunger 23 will be returned to normal position when released. A clamping collar A carrying a plurality of outwardly projecting extensions a is adjustably secured to the spout Y adapted to contact the neck of a receptacle or the portion about the filling opening therein to hold the lower extremity of the spout Y at a determined distance from the top of the receptacle.

It will be seen that the funnel may be held by handle 21 and valve 9 opened by pressing the thumb piece 23ª of the plunger disposed conveniently adjacent handle 21.

In Fig. 3 the preferred form of my valve opening means is illustrated. The spout Z is provided with the liquid passage 5, float chamber 6, valve seat 8′, valve 9, float 11, float rod 12 and connecting member 14, as in the other forms of the invention illustrated. To open valve 9, however, a lever 25 is provided having its inner end working through a slot 26. In spout Z the outer end of lever 25 constitutes a finger piece 25ª of considerably greater weight than the inner end of said lever adapted to return the lever to normal raised position when the same is released. The working end of lever 25 is adapted to engage loop 14ª of connecting member 14 when valve 9 is closed, whereupon the valve may be swung open by raising finger member 25ª.

The several forms of the invention illustrated are practically identical with the exception of the valve opening means, and the operation thereof may be summarized as follows: Assuming the spout of the liquid dispenser to be held below the top of the receptacle being filled, and the valve 9 opened, liquid will be delivered to the tank or receptacle until the level of liquid within the receptacle lies slightly above the lower end of the spout, whereupon float 11 will be raised by the liquid in the receptacle thereby tripping connecting member 14 through the engagement of the eye 12ᵇ with the upper portion of loop 14ª. Automatically the flow of liquid through the passage 5 swings the valve 9 against its seat 8 thereby efficiently closing off the passage of liquid through the device and preventing the receptacle from overflowing. The depth at which the receptacle may be filled is, of course, determined by the position of the lower end of the spout, and in the case of the funnel illustrated in Fig. 2 adjustable means are provided in the collar 8 for engaging the neck or top of the receptacle to hold the bottom of spout Y the proper distance therebelow.

Connecting member 14 being disposed concentrically with the pivot 10 of valve 9 will be swung substantially in the path of the circle in which it lies, thereby sliding smoothly through the eye 12$^b$ of the float rod and requiring a minimum amount of space for its swinging movement. The connection or extension member of the former identified patent comprised a strand of wire having divergent portions and including a loop intermittently engageable with the stem of the float. This required a considerable amount of space for its swinging movement, and furthermore, often caused the float rod to become bent, since it did not slide uniformly and smoothly therethrough. The aperture required through the partition between the float chamber and liquid passage necessarily had to be of considerable length since an extension member of this form could not be disposed in the arc of a circle concentric with the valve pivot.

My new and improved means for manually opening the valve shown in Fig. 3 comprising the lever 25 adapted to engage the end of loop 14$^a$ supplies a much simpler and highly reliable mechanism for accomplishing the desired results in any type of spout or liquid dispenser.

From the foregoing description it will be seen that in this invention important improvements have been made over the invention disclosed in my original patent, which greatly increase the efficiency of the device and permit the same to be applied to all types of delivery spouts and liquid dispensers.

It will, of course, be understood that various changes may be made in the form, details, arrangement and proportions of parts without departing from the scope of the invention.

What is claimed is:

In combination with a delivery spout, an automatic shut off device comprising a partition in said spout defining a float chamber and a discharge passage, a vertically movable float disposed in said float chamber and carrying an upwardly projecting float rod, a hinged valve disposed in said liquid passage and a unitary substantially arcuate connecting member rigidly carried by said valve and projecting into said float chamber having sliding engagement with said float rod and terminating in an upwardly curved open loop adapted to be engaged by said float rod when said valve is open and said float is raised.

In testimony whereof I affix my signature.

FREDERICK C. BAXTER.